United States Patent
Lu et al.

(10) Patent No.: US 6,257,879 B1
(45) Date of Patent: Jul. 10, 2001

(54) PAIRED STRAIGHT HEARTH (PSH) FURNACES FOR METAL OXIDE REDUCTION

(76) Inventors: Wei-Kao Lu, 420 Mountain Crest Avenue, Hamilton, Ontario (CA), L9C 1L8; Dianbing Huang, 75 Mericourt Road, Apt. 117, Hamilton, Ontario (CA), L8S 2N6

( * ) Notice: Subject to any disclaimer, the term of this patent is extended or adjusted under 35 U.S.C. 154(b) by 0 days.

(21) Appl. No.: 09/507,695

(22) Filed: Feb. 22, 2000

Related U.S. Application Data

(60) Provisional application No. 60/122,086, filed on Feb. 26, 1999.

(51) Int. Cl.[7] .................................................. F27B 9/24
(52) U.S. Cl. ............................ 432/121; 432/126; 414/284
(58) Field of Search .................................. 432/121, 123, 432/126, 137, 138, 143, 149, 153, 155; 414/284, 586; 75/474, 484

(56) References Cited

U.S. PATENT DOCUMENTS

| | | | |
|---|---|---|---|
| 1,738,039 | * 12/1929 | Cope et al. | 432/126 |
| 4,205,935 | * 6/1980 | Edler et al. | 432/126 |
| 5,350,295 | * 9/1994 | Kenji | 432/121 |
| 5,890,890 | * 4/1999 | Groom | 432/121 |

* cited by examiner

*Primary Examiner*—Gregory Wilson
(74) *Attorney, Agent, or Firm*—Robert F. Delbridge

(57) ABSTRACT

Equipment for the reduction of metal oxides with carbonaceous reductants includes a pair of straight moving hearth furnaces each having a charging end and a discharging end. Each furnace has a train of detachable hearth sections to enable each hearth section to be removed at the discharging end of one furnace and attached at the charging end of the other furnace.

12 Claims, 5 Drawing Sheets

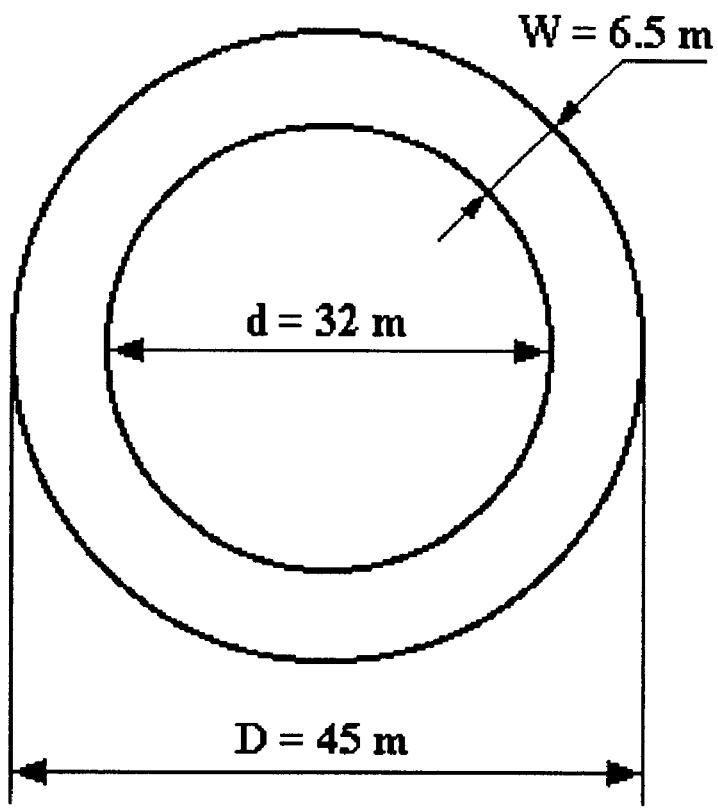
Fig. 1A (Prior Art)
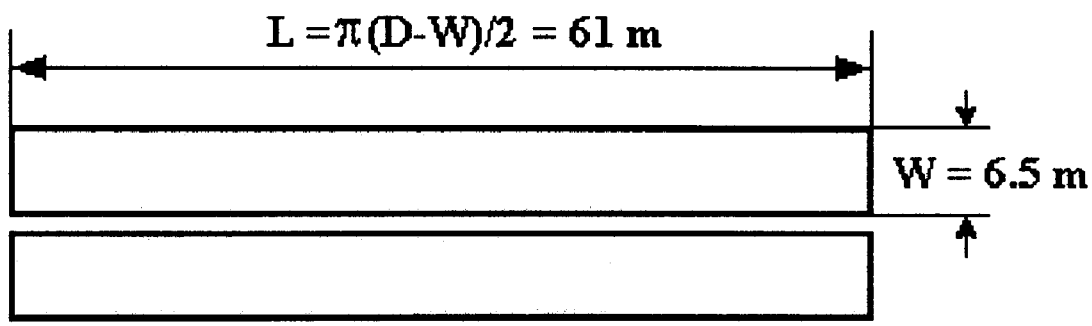
Fig. 1B (Invention)

PAIRED STRAIGHT HEARTH (PSH) FURNACES FOR METAL OXIDE REDUCTION

RELATED APPLICATION

This application claims priority from U.S. Provisional Patent Application No. 60/122,086 filed Feb. 26, 1999.

FIELD OF INVENTION

This invention relates to equipment for the reduction of metal oxides with carbonaceous reductants.

BACKGROUND OF THE INVENTION

Rotary hearth furnaces (RHF) are used for reduction of iron oxides in agglomerates containing iron ore or waste oxides with carbonaceous reductant in steel plants. The largest one RHF currently under construction for ironmaking from iron ores in Thailand represents the best available technology for comparison with the present invention. The RHF of Nakornthai Strip Mill Company Ltd. (NSM), in Thailand is of 45 meters (O.D.) with a hearth width of 6.5 meters to given an annual capacity in the range of 300,000 to 500,000 totals of direct reduced iron (DRI) on the total hearth area of 800 m$^2$, depending on the degree of metallization of products. It is designed to have one or two layers of pellets containing carbonaceous reductant on the rotating hearth with heat provided by a flame. Near the end of one revolution, DRI is discharged with a screw discharger.

Use of an RHF for reduction of metal oxides at the present time has the following shortcomings:
(A) Less efficient use of land because the space inside the rotary hearth is of essentially the same area as that of the hearth.
(B) High speed of the rolling stock. The linear speed of the rotating hearth increases with the increase of the diameter of the RHF, and limits the size of each unit.
(C) The discharging operation: Higher linear speed of hearth movement and wider width of the hearth will lead to increasingly demanding operation of the screw discharger.
(D) Servicing of any part of the hearth of an RHF necessitates shutdown of the whole unit and cooling to a low temperature. This lowers production per unit and shortens the service life of the furnace lining due to temperature changes.

SUMMARY OF THE INVENTION

According to the invention, equipment for the reduction of metal oxides with carbonaceous reductants including a pair of straight moving hearth furnaces each having a charging end and a discharging end, each furnace comprising a train of detachable hearth sections to enable each hearth section to be removed at the discharging end of one furnace and attached to the charging end of the other furnace.

The pair of straight hearth moving furnaces may be in side-by-side parallel relationship with the charging end of each furnace adjacent the discharging end of the other furnace.

The detachable hearth sections of each furnace may be lined with refractory material so as to be impermeable to gas flow therethrough. Also, each detachable hearth section may have retaining walls on opposite sides thereof which extend parallel to the direction of movement of the furnace hearth, retaining walls having a height at least as high as the height of the agglomerate bed on the hearth.

The equipment may also include means to direct the generated gas from a region adjacent the charging end of each furnace to a region adjacent the discharging end of the other furnace for flow through at least a portion of the other furnace counter-current to the metal oxides and carbonaceous reductants.

Each straight moving hearth furnace may have firewalls adjacent the ends thereof which separate the charging and discharging ends from the high temperature processing zone therebetween.

Each furnace may have a chimney of predetermined height and location to maintain hot gas flow countercurrent to the solid flow in the furnace and maintain a negative pressure.

The equipment may also include means to control the temperature and reducing potential of the flame in each furnace such that the solids are exposed to an atmosphere with increased reducing power with increase of processing time and the gas is fully oxidized before leaving the furnace.

DESCRIPTION OF THE DRAWINGS

Embodiments of the invention will now be described, by way of example, with reference to the accompanying drawings, of which:

FIG. 1A is a top view of the hearth of a known RHF,

FIG. 1B is a top view of the hearth of paired straight moving hearth furnaces in accordance with the invention, with the same hearth area of the RHF shown in FIG. 1A.

DESCRIPTION OF PREFERRED EMBODIMENTS

Details of paired straight hearth (PSH) furnaces for reduction of metal oxides in accordance with the invention will be described later. A comparison of the layout and the size of equipment for the prior art and the present invention is given below:

The RHF of NSM, Thailand is shown in FIG. 1A and the present invention—Paired Straight Hearth (PSH) Furnaces is shown in FIG. 1B.

Assumptions:
(i) Same total hearth area
(ii) Same width of the hearth, W, for a RHF $$W = \frac{D-d}{2}$$

The length of the straight hearth furnace, L, may be calculated as follows:

For a PSH furnace, the total hearth area $A_{PSHF}$ $$A_{PSHF} = 2WL$$

$$= 2\left[\frac{1}{2}(D-d)L\right]$$

For a RHF, the total hearth area $A_{RHF}$, $$A_{RHF} = \frac{\pi}{4}(D^2 - d^2)$$

Let $A_{PSHF} = A_{RHF}$ and solve the equation for L, one gets $$L = \frac{\pi}{4}(D+d), \text{ or}$$

$$L = \frac{\pi}{2}(D-W)$$

The length of a PSH furnace of 800 m² area and a width of 6.5 m is 61 meters as shown in FIG. 1B.

The ratio of the speed of rolling stock will be proportional to the distance (L for a PSH furnace, and πD for an RHF) to be travelled for the same residence time, i.e.

61 (PSHF):141 (RHF)

or 1 (PSHF):2.3 (RHF)

Certain overall feature of our invention may be explained by comparing with two well known furnaces in the metallurgical industry, i.e. the rotary hearth furnace and the continuous travelling grate machine for sintering of iron ore or pellet induration.

Figure 3A:
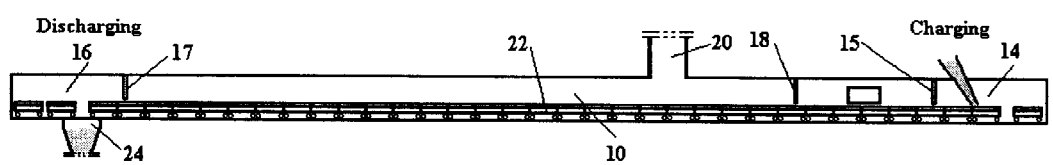
FIG. 3A is a side view of the straight moving hearth furnaces.
Figure 3B:
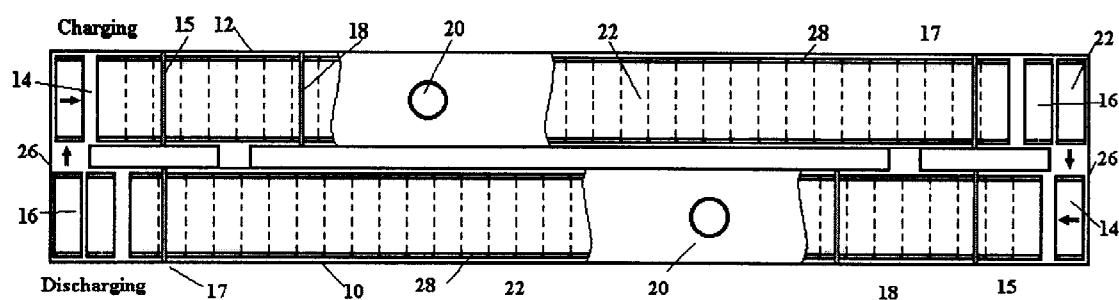
FIG. 3B is a top view thereof.

A PSH furnace in accordance with the invention may, as shown in FIGS. 3A and 3B, comprise a train of detachable hearth sections 22 like the pallets in a continuous travelling grate furnace. The adjacent sections (pallets) 22 are placed together without any barrier. This straight hearth furnace is different from continuous travelling grate furnaces in that individual pallets 22 are readily separated at the discharging end 16 and re-attached at the charging end 14.

The detachable hearth sections (pallets) 22 of a PSH furnace may be lined with refractory materials, as in an RHF, and not permeable to gas flow, unlike the pallets in a travelling grate furnace.

Figure 2:
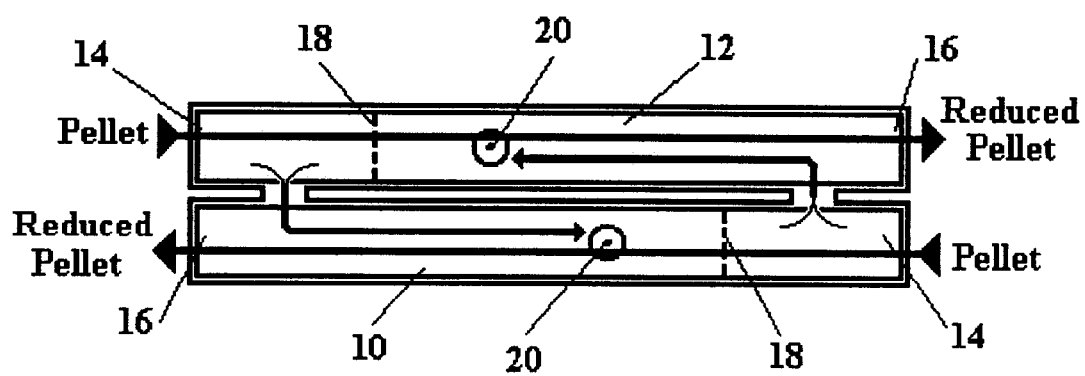
FIG. 2 shows the direction of gas and solid flows in the straight moving hearth furnaces of FIG. 1B.

An arrangement of PSH furnaces 10, 12 in accordance with this invention with solid charge moving in opposite and straight directions is also shown in FIG. 2. The gas generated by chemical reactions flows from the region near charging end 14 of each furnace 10, 12 to the region near discharging end 16 of the other, then counter-currently to the solid movement. This provides more effective use of the volatile matter in reductant and elimination of the risk of re-oxidation of metallized products (DRI in the case of ironmaking) immediately before discharging.

In order to retain the residual heat in the hearth, immediately after discharging, a discharged pallet 22 is moved sideways to the other furnace to receive fresh pellets. As shown in FIG. 2, the solid charge is carried by the straight hearth furnaces 10, 12 from one end to the other, i.e. two parallel solid flows in opposite directions. The gas flow in general counter-current to the solid flow is due to the presence of a firewall 18 between the entrance of solid charge and the exit of flue gas, namely a chimney 20. The gas generated in the pellet bed before reaching the firewall 18 is rich in volatile matter from the carbonaceous reductant. The solid charge passes underneath the firewall 18 that directs the gas to move through the gas passages 19 to the finishing end of the respective straight hearth furnace 10 or 12. At the finishing end, the gas entering from the adjacent straight hearth furnace 10 or 12 is partially oxidized by injecting an air/oxygen mixture or preheated air to generate heat for the process and to maintain a reducing atmosphere and/or to minimize the risk of re-oxidation of metallized metal at a very high temperature.

Further features of this invention including charging/discharging operations are shown in FIGS. 3A and 3B. The high temperature regions are between firewalls 15 and 17. Firewall 18 is used to control the gas flow. Each section 22 of the hearth 10 or 12 carrying reduced products, after passing firewall 17 at the end of the straight hearth furnace, can be detached to discharge the products into a receiving hopper 24, see FIG. 3A. Possible ways of discharging will be described later. The empty hearth section 22 will be moved immediately, as shown in FIG. 3B, to the charging end 14 of the adjacent straight hearth furnace to receive fresh pellets. With the same mechanism at both ends of the paired straight hearth furnaces 10, 12, the circulation of all sections 22 of hearth can be carried out.

Figure 4:
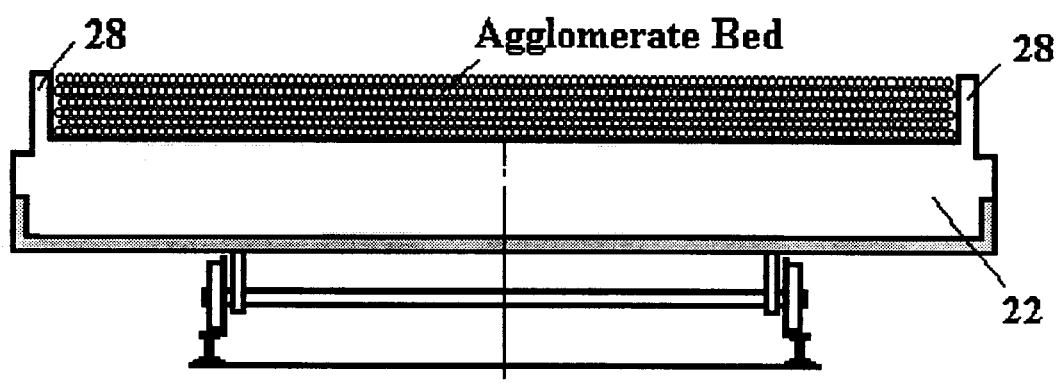
FIG. 4 is a cross-section view of a detachable hearth pallet used with the straight moving hearth furnaces.

Referring now to FIG. 4, the productivity (Tonnes reduced agglomerate/m²/hour) can be increased if a taller and even agglomerate bed under a flame of higher temperature is used, see U.S. patent application Ser. No. 09/192,927 filed Nov. 16, 1998. Side retaining walls 28 at least as tall as the agglomerate bed are provided. The presence of the retaining walls will however cause an operational problem for a screw discharger which moves reduced product in a direction perpendicular to the movement of the hearth. As a feature of this invention, each hearth section 22 may be detached after passing firewall 17 and discharge reduce product without interference from the retaining walls 28.

Figure 5:
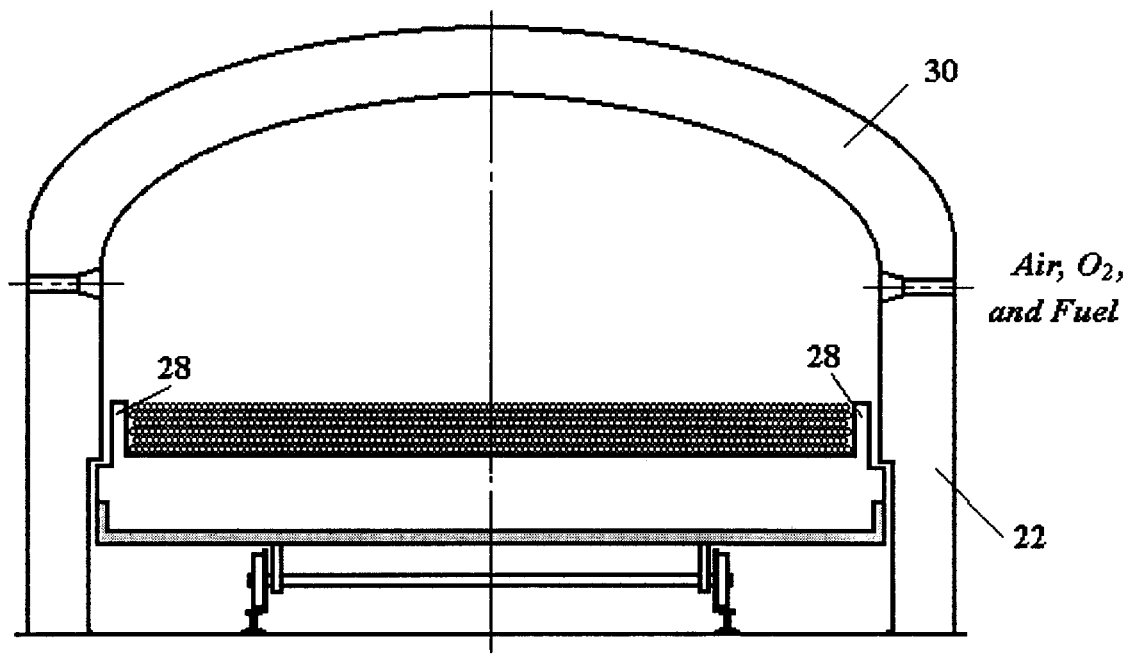
FIG. 5 is a cross-section view of an enclosed straight moving hearth furnace.

Charging/discharging operations may be carried out outside of the high temperature regions but inside the overall enclosure 30 (FIG. 5).

(i) Charging

The system for charging and distributing pellets or briquettes onto the furnace hearth may be the conventional system used with a straight grate machine for iron ore pellet induration. But a device for sealing, e.g. double hopper arrangement, to avoid gas flow between the furnace and the atmosphere should be included for environment protection.

(ii) Discharging

As mentioned earlier, the discharging process is a feature of this invention. The discharging process may have three steps:

Step 1, Speed-Up and Detachment

The pallet (furnace section 22) is speeded up after passing the firewall 17 at the discharging end by a speed-up driver. This speed-up driver, which is independent from the main driver for moving the pallet train, runs at a higher speed than the main driver does. After being speeded up to detach from the train, the pallet is then under the control of the discharging device.

Step 2, Discharging

In order to discharge the DRI to the receiving hopper 24 beneath the pallet 22, the discharge device may perform this task in one of the following ways:

by tilting the pallet to cause the DRI to slip downward under the effect of the gravity, like a dump truck and, if necessary, with the assistance of a mechanical device, by turning the pallet over, upside down, to dump the DRI onto the receiving hopper 24, or by removing the DRI from a moving pallet mechanically and horizontally by a fixed or running scraper.

Step 3, Re-attaching the Pallet 22 onto the Charging End of the Adjacent Furnace The discharge device leaves the empty pallet 22 in a upright position on a carrier. The carrier may move the pallet to the charging end 14 of the adjacent furnace to be re-attached to the train. The carrier may also take this pallet 22 out of circulation by placing it aside for maintenance.

In the conventional rotary hearth furnace for iron ore reduction, the furnace hearth is a very large unit of brick-lined steel turntable, and the DRI is discharged in the radial direction by a screw discharger. The advantage of this construction is relatively simplified for driving. But the repair of any part of the hearth or screw discharger which requires frequent maintenance will necessitate the whole unit to be shut down and cooled. This is harmful to the furnace refractory lining and a major cause of lowering the availability of RHF for reduction of metal oxides.

In this invention, the furnace hearth may be made of a train of detachable sections 22 (pallets) without any moving part in a high temperature region for charging or discharging operation. Every pallet 22, when it needs to be repaired, may be removed from the train and replaced by one in reserve without interruption of the operation. The pallet which is taken off the train will be serviced off-line.

The PSH furnace, as RHF, is entirely enclosed by a housing 30, see FIG. 5, and operated under negative pressure. Doors 26 at both ends, see FIG. 3, of the straight hearth furnace 10 or 12 may be opened for the movement of a pallet 22. Due to the movement of hot gas, negative pressure is maintained and escape of flue gas and dust to the environment is very unlikely.

The process of reduction of metal oxides has contradictory requirements for the flame above the agglomerate bed, i.e. to liberate maximum chemical heat in fuel and to prevent reoxidation of the reduced metal. For the liberation of more chemical energy of carbon to heat, it is necessary that the combustion product (flame) is more oxidizing for the metallized product. The advantages of this invention may be explained with the following two examples.

In a blast furnace, the gas flows counter-currently to the movement of iron-bearing burden. The gas phase is hotter at all gas-solid contact points. The highly metallized burden contacts hottest and most reducing gas. There is no risk of reoxidation of metallic iron. After leaving the raceway, there is no way to introduce air or oxygen to further oxidize the gas along its path for complete liberation of chemical energy of carbon. Therefore, in the top gas only 50% carbon oxide is in the form of $CO_2$ with the balance being CO.

For those RHF in operation at present time, the counter-current gas-solid flow pattern is not well established. In order to prevent re-oxidation of DRI, the ratio of carbon oxides in the flame is maintained at $CO/CO_2=2/1$. Therefore, almost one half of the chemical energy of the carbon is not properly liberated into the correct location in the furnace for the processing.

It is believed that, before a certain degree of metallization, e.g. 85%, for a tall pellet bed is achieved, intensive heat supply and transmission of heat from the flame to bed is required and it can tolerate relatively strong oxidizing potential. The gas above the agglomerate bed and the burners in this low and medium metallization region, between firewalls 15 and 17 will be aimed for complete combustion.

After the certain degree of metallization, e.g. 90%, the bed of metallized product requires the flame above to be maintained at high temperature and may require the flame to have certain reducing potential. This is the high metallization region near firewall 17 in FIG. 3. The gas of very strong reducing potential could be introduced, if necessary, into the high metallization region from the charging end of the adjacent furnace. Because of the larger L/W ratio of the furnace hearth, an effective counter-current flow of gas-solid streams may be maintained very well. In this region, the oxidant to be introduced from side walls should be oxygen (or preheated air) to promote a flame of high temperature and low volumetric flow. Further downstream towards the chimney 20, in gas flow, air and fuel in addition to oxygen may be induced through burners for complete combustion to provide intensive heat supply and transmission.

In summary, in PSHF, the rate of energy consumption on reduced agglomerate production will be much lower and the risk of re-oxidation of DRI will be essentially eliminated.

Advantages of this invention are as follows:
A. Efficient use of land.
B. Efficient use of reductant and heat derived from carbonaceous materials.
C. Complete liberation of chemical energy of fuel used within the reduction unit.
D. Efficient control of oxidizing/reducing potential of the atmosphere to meet heat requirement at different stage of processing of iron ore, chromite, ilmenite, etc. and also wastes containing oxides of heavy metals, and protection of metallized product from re-oxidation.
E. Containment of tall and uniform pellet beds.
F. Simplicity in the new charging/discharging mechanism.
G. Simplicity and efficiency in the maintenance of hearth.

Other embodiments and advantages of this invention will be readily apparent to a person skilled in the art.

What is claimed is:

1. Equipment for the reduction of metal oxides with carbonaceous reductants including a pair of straight moving hearth furnaces each having a charging end and a discharging end, each furnace comprising a train of detachable sections to enable each section to be removed at the discharging end of one furnace and attached at the charging end of the other furnace.

2. Equipment according to claim 1 wherein the pair of straight moving hearth furnaces are in side-by-side parallel relationship with the charging end of each furnace adjacent to the discharging end of the other furnace.

3. Equipment according to claim 1 wherein the detachable hearth sections are lined with refractory material so as to be impermeable to gas flow there through.

4. Equipment according to claim 1 wherein each detachable hearth section has retaining walls on opposite sides thereof which extend parallel to the direction of movement of the furnace hearth, said retain walls having a height at least as high as the height of the agglomerate bed on the hearth.

5. Equipment according to claim 1 including means to direct generated gas from a region adjacent the charging end of each furnace to a region adjacent the discharging end of the other furnace for flow through at least a portion of the other furnace counter-current to the metal oxides and carbonaceous reductants.

6. Equipment according to claim 1 wherein each straight moving hearth furnace has firewalls adjacent the ends thereof which separate the charging and discharging ends from the processing zone.

7. Equipment according to claim 1 wherein each furnace has a chimney of predetermined height and location to maintain hot gas flow countercurrent to solid flow in the furnace and to maintain a negative pressure.

8. Equipment according to claim 1 also including means to control the temperature and reducing potential of the flame in each furnace, such that the solids are exposed to an atmosphere with increased reducing power with increase of processing time and the gas is fully oxidized before leaving the furnace.

9. A method of reducing metal oxides with carbonaceous material including providing a pair of straight moving hearth furnaces each having a charging end and a discharging end and each comprising a train of detachable charge-carrying sections, detaching each section at the discharging end of each furnace, removing charge therefrom and attaching the section to the train at the charging end of the other furnace to receive fresh charge.

10. A method according to claim 9 including positioning the pair of straight moving hearth furnaces in side-by-side parallel relationship with the charging end of each furnace adjacent the discharging end of the other furnace.

11. A method according to claim 9 wherein the detachable hearth sections are impermeable to gas flow there through.

12. A method according to claim 9 including directing generated gas from a region adjacent the charging end of each furnace to a region adjacent the discharging end of the other furnace, for flow through at least a portion of the other furnace counter-current to the charge.

* * * * *